US011665701B2

(12) United States Patent
Akkarakaran et al.

(10) Patent No.: US 11,665,701 B2
(45) Date of Patent: May 30, 2023

(54) SIDELINK FEEDBACK TIMING

(71) Applicant: QUALCOMM Incorporated, San Diego, CA (US)

(72) Inventors: Sony Akkarakaran, Poway, CA (US); Jelena Damnjanovic, Del Mar, CA (US); Tao Luo, San Diego, CA (US); Juan Montojo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 17/301,086

(22) Filed: Mar. 24, 2021

(65) Prior Publication Data

US 2021/0307058 A1 Sep. 30, 2021

Related U.S. Application Data

(60) Provisional application No. 63/001,100, filed on Mar. 27, 2020.

(51) Int. Cl.
*H04W 72/14* (2009.01)
*H04L 1/1867* (2023.01)
(Continued)

(52) U.S. Cl.
CPC ............ *H04W 72/14* (2013.01); *H04L 1/1896* (2013.01); *H04W 72/0446* (2013.01); *H04W 72/0453* (2013.01); *H04W 88/04* (2013.01)

(58) Field of Classification Search
CPC ............. H04W 72/14; H04W 72/0446; H04W 72/0453; H04W 88/04; H04L 1/1896
See application file for complete search history.

(56) References Cited

U.S. PATENT DOCUMENTS

2016/0353478 A1\* 12/2016 Kim .................... H04W 56/002
2017/0331577 A1\* 11/2017 Parkvall ................. H04W 4/00
(Continued)

FOREIGN PATENT DOCUMENTS

WO   WO-2019017733 A1    1/2019
WO   WO-2020243736 A2 \* 12/2020

OTHER PUBLICATIONS

Huawei, et al., "Design and Contents of PSCCH and PSFCH", 3GPP TSG RAN WG1 Meeting #96, 3GPP Draft, R1-1903071, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, 10 Pages, Feb. 15, 2019 (Feb. 15, 2019), XP051600767, Retrieved from the Internet: URL: http://www.3gpp.org/ftp/tsg%5Fran/WG1%5FRL1/TSGR1%5F96/Docs/R1%2D1903071%2Ezip [retrieved on Feb. 15, 2019] section 2, section 3.
(Continued)

*Primary Examiner* — Jael M Ulysse
(74) *Attorney, Agent, or Firm* — Harrity & Harrity LLP/Qualcomm Incorporated (57) ABSTRACT

Various aspects of the present disclosure generally relate to wireless communication. In some aspects, a wireless communication device may receive a sidelink communication on a sidelink. The sidelink communication may include at least one of a grant, data received on a resource identified by the grant, a multi-stage grant, a multi-packet grant, or a relaying communication. The wireless communication device may transmit, on the sidelink after a time period since receiving the sidelink communication, a feedback message acknowledging receiving the sidelink communication. Numerous other aspects are provided.

22 Claims, 6 Drawing Sheets

(51) Int. Cl.
*H04W 88/04* (2009.01)
*H04W 72/0453* (2023.01)
*H04W 72/0446* (2023.01)

(56) References Cited

U.S. PATENT DOCUMENTS

| | | | | |
|---|---|---|---|---|
| 2018/0035427 | A1* | 2/2018 | Gupta | H04L 5/0057 |
| 2018/0035435 | A1* | 2/2018 | Gupta | H04L 5/0055 |
| 2018/0035448 | A1* | 2/2018 | Gupta | H04W 72/14 |
| 2018/0049143 | A1* | 2/2018 | Gupta | H04W 16/14 |
| 2018/0049219 | A1* | 2/2018 | Gupta | H04W 76/14 |
| 2018/0324842 | A1* | 11/2018 | Gulati | H04W 76/14 |
| 2019/0052411 | A1* | 2/2019 | Chae | H04W 72/0446 |
| 2019/0280824 | A1* | 9/2019 | Werner | H04L 1/1854 |
| 2019/0357240 | A1* | 11/2019 | Kim | H04W 72/042 |
| 2020/0112982 | A1* | 4/2020 | Li | H04W 72/0406 |
| 2020/0178292 | A1* | 6/2020 | Kim | H04B 7/14 |
| 2020/0220694 | A1* | 7/2020 | Khoryaev | H04L 1/1816 |
| 2020/0288286 | A1* | 9/2020 | Hwang | H04L 1/1854 |
| 2020/0351033 | A1* | 11/2020 | Ryu | H04W 72/02 |
| 2021/0028891 | A1* | 1/2021 | Zhou | H04L 1/1854 |
| 2021/0105126 | A1* | 4/2021 | Yi | H04W 72/1242 |
| 2021/0160015 | A1 | 5/2021 | Chae et al. | |
| 2021/0321396 | A1* | 10/2021 | Li | H04L 1/1854 |
| 2021/0376959 | A1* | 12/2021 | Yang | H04L 1/1887 |
| 2022/0109527 | A1* | 4/2022 | Hwang | H04L 5/0055 |
| 2022/0173874 | A1* | 6/2022 | Fehrenbach | H04W 72/0446 |
| 2022/0329368 | A1* | 10/2022 | Zhao | H04W 4/16 |

OTHER PUBLICATIONS

International Search Report and Written Opinion—PCT/US2021/070310—ISA/EPO—dated Jul. 14, 2021.

ITL: "Discussion on NR V2X HARQ Mechanism", 3GPP Draft, 3GPP TSG RAN WG1 Ad-Hoc Meeting 1901, R1-1901146_V2X_HARQ Procedure, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593990, pp. 1-5, Retrieved from the Internet: URL: http://www.3gpp.org/ftp/Meetings%5F3GPP%5FSYNC/RAN1/Docs/R1%2D1901146%2Ezip [retrieved on Jan. 20, 2019] paragraph [0002]-paragraph [0004], section 1, section 3, the whole document.

NEC: "Remaining Issues on Resource Allocation Mode 1", 3GPP TSG RAN WG1 #100-e, 3GPP Draft, R1-2000765, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, pp. 1-2, Feb. 14, 2020 (Feb. 14, 2020), XP051853047, Retrieved from the Internet: URL: https://ftp.3gpp.org/tsg_ran/WG1_RL1/TSGR1_100_e/Docs/R1-2000765.zip R1-2000765.docx [retrieved on Feb. 14, 2020] section 2.

VIVO: "Remaining Issues on Mode 1 Resource Allocation Mechanism", 3GPP TSG RAN WG1 #100, 3GPP Draft, R1-2000316, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, 18 Pages, Feb. 14, 2020 (Feb. 14, 2020), XP051852805, Retrieved from the Internet: URL: https://ftp.3gpp.org/tsg_ran/WG1_RL1/TSGR1_100_e/Docs/R1-2000316.zip R1-2000316 mode-1_vivo final.docx [retrieved on Feb. 14, 2020] section 2, section 3.2.

* cited by examiner

SIDELINK FEEDBACK TIMING

CROSS-REFERENCE TO RELATED APPLICATION

This patent application claims priority to U.S. Provisional Patent Application No. 63/001,100, filed on Mar. 27, 2020, entitled "SIDELINK FEEDBACK TIMING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for sidelink feedback timing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication, performed by a wireless communication device, may include receiving a sidelink communication on a sidelink. The sidelink communication may include at least one of a grant, data received on a resource identified by the grant, a multi-stage grant, a multi-packet grant, or a relaying communication. The method may include transmitting, on the sidelink after a time period since receiving the sidelink communication, a feedback message acknowledging receiving the sidelink communication.

In some aspects, a wireless communication device for wireless communication may include a memory and one or more processors operatively coupled to the memory. The memory and the one or more processors may be configured to receive a sidelink communication on a sidelink, where the sidelink communication includes at least one of a grant, data received on a resource identified by the grant, a multi-stage grant, a multi-packet grant, or a relaying communication. The memory and the one or more processors may be configured to transmit, on the sidelink after a time period since receiving the sidelink communication, a feedback message acknowledging receiving the sidelink communication.

In some aspects, a non-transitory computer-readable medium may store one or more instructions for wireless communication. The one or more instructions, when executed by one or more processors of a wireless communication device, may cause the one or more processors to receive a sidelink communication on a sidelink, where the sidelink communication includes at least one of a grant, data received on a resource identified by the grant, a multi-stage grant, a multi-packet grant, or a relaying communication, and transmit, on the sidelink after a time period since receiving the sidelink communication, a feedback message acknowledging receiving the sidelink communication.

In some aspects, an apparatus for wireless communication may include means for receiving a sidelink communication on a sidelink, where the sidelink communication includes at least one of a grant, data received on a resource identified by the grant, a multi-stage grant, a multi-packet grant, or a relaying communication, and means for transmitting, on the sidelink after a time period since receiving the sidelink communication, a feedback message acknowledging receiving the sidelink communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
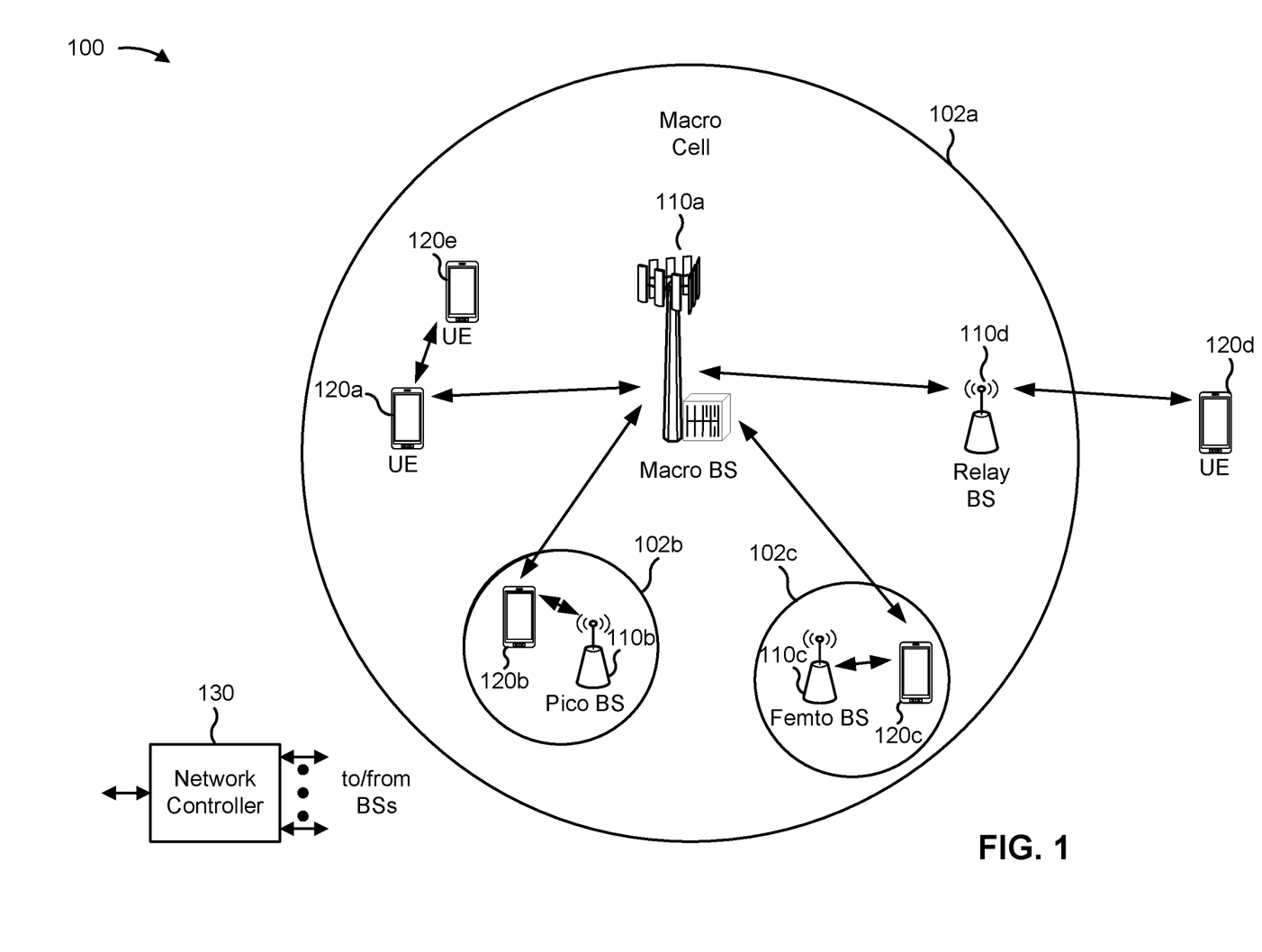
FIG. 1 is a block diagram illustrating an example of a wireless communication network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
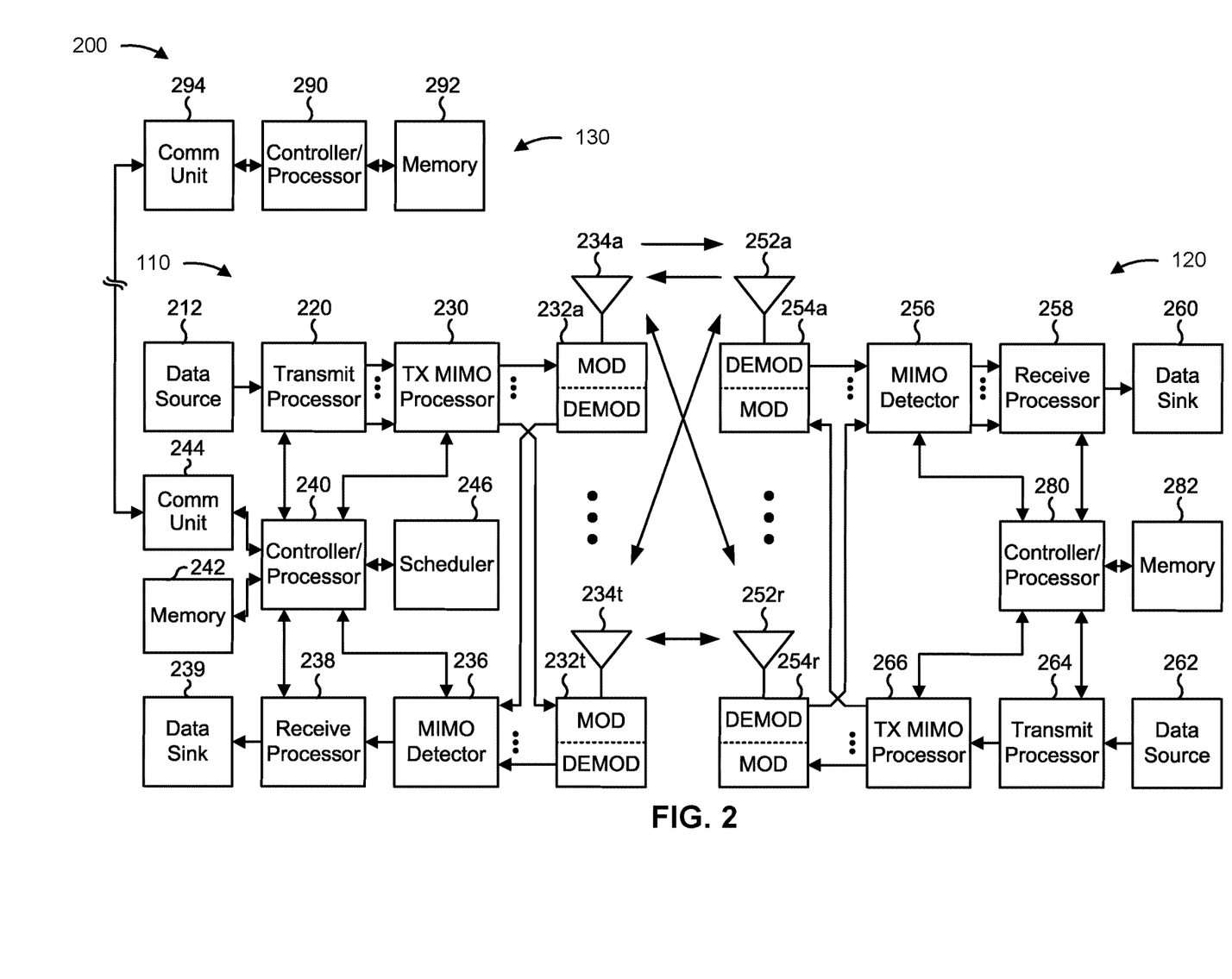
FIG. 2 is a block diagram illustrating an example of a base station in communication with a user equipment in a wireless communication network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 1-6).

Controller/processor 240 of base station 110, controller/processor 280 of UE 120, and/or any other component(s) of FIG. 2 may perform one or more techniques associated with sidelink feedback messaging, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some aspects, executing instructions may include running the instructions, converting the instructions, compiling the instructions, and/or interpreting the instructions, among other examples.

In some aspects, a wireless communication device, such as BS 110 or UE 120, may include means for receiving a sidelink communication on a sidelink, where the sidelink communication includes at least one of a grant, data received on a resource identified by the grant, a multi-stage grant, a multi-packet grant, or a relaying communication, means for transmitting, on the sidelink after a time period since receiving the sidelink communication, a feedback message acknowledging receiving the sidelink communication, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

While blocks in 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
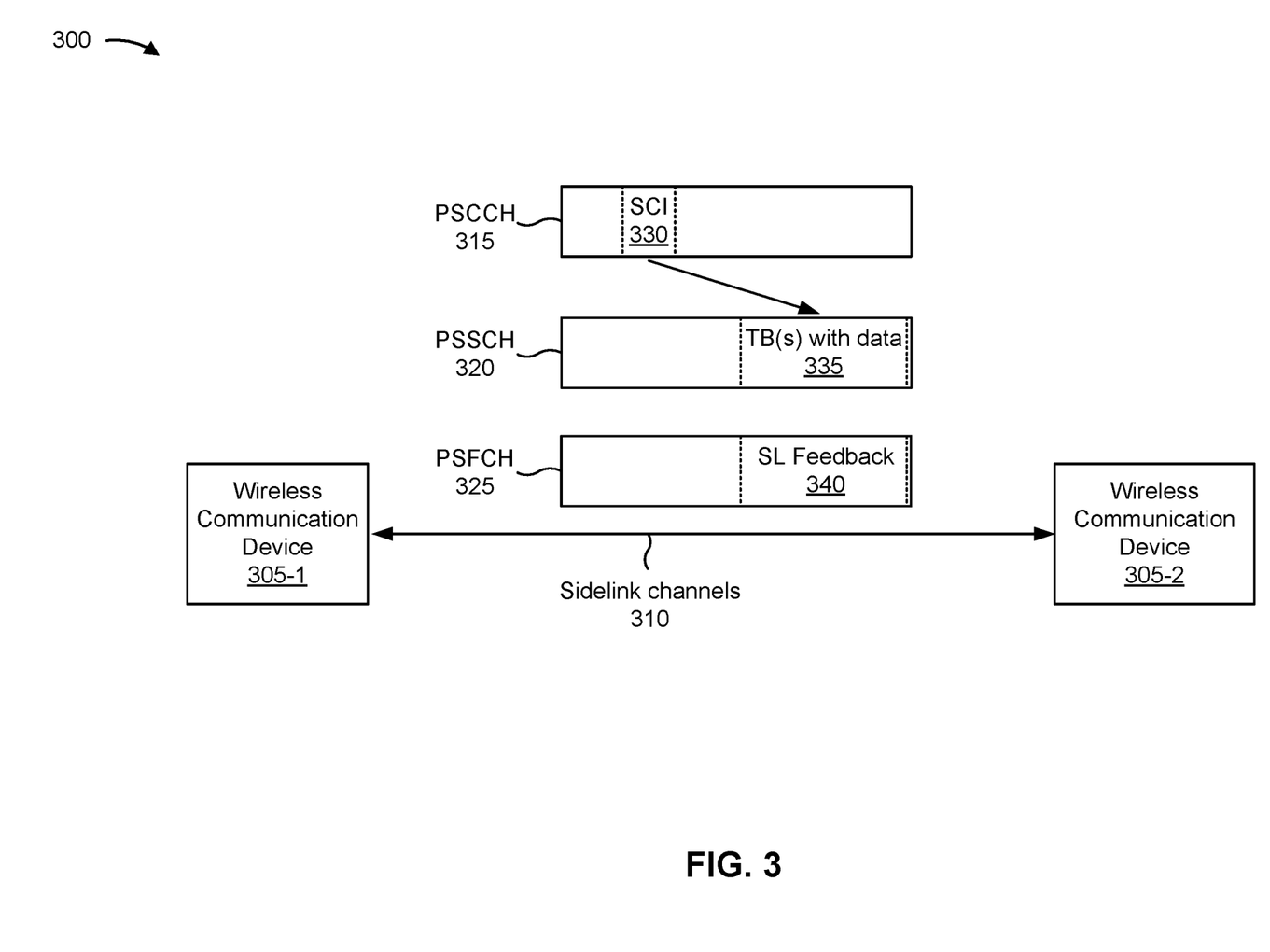
FIG. 3 is a diagram illustrating an example of sidelink communications, in accordance with the present disclosure.

FIG. 3 is a diagram illustrating an example 300 of sidelink communications, in accordance with various aspects of the present disclosure.

As shown in FIG. 3, a first wireless communication device 305-1 may communicate with a second wireless communication device 305-2 (and one or more other wireless communication devices 305) via one or more sidelink channels 310. The wireless communication devices 305-1 and 305-2 may communicate using the one or more sidelink channels 310 for P2P communications, D2D communications, V2X communications (e.g., which may include V2V communications, V2I communications, V2P communications), and/or mesh networking. In some aspects, wireless communication devices 305 (e.g., wireless communication device 305-1 and/or wireless communication device 305-2) may correspond to one or more UEs 120, BSs 110, IAB nodes, and/or the like. In some aspects, one or more sidelink channels 310 may use a PC5 interface and/or may operate in a high frequency band (e.g., the 5.9 GHz band). Additionally, or alternatively, wireless communication devices 305 may synchronize timing of transmission time intervals (TTIs) (e.g., frames, subframes, slots, symbols, and/or the like) using global navigation satellite system (GNSS) timing.

As further shown in FIG. 3, one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a BS 110 via an access link or an access channel PSSCH 320 may be used to communicate data, similar to a physical downlink shared channel (PDSCH) and/or a physical uplink shared channel (PUSCH) used for cellular communications with a BS 110 via an access link or an access channel. For example, PSCCH 315 may carry sidelink control information (SCI) 330, which may indicate various control information used for sidelink communications, such as one or more resources (e.g., time resources, frequency resources, spatial resources) where a transport block (TB) 335 may be carried on the PSSCH 320. TB 335 may include data. PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like. An ACK may include, for example, two identical OFDM symbols, a resource block, a sequence (like Uu PUCCH-format0), and/or a bit. A first symbol may be used for automatic gain control training.

PSCCH, PSSCH, and PSFCH may allow time division multiplexing (TDM) between the channels at transmission, but may not allow frequency division multiplexing (FDM). A PSFCH resource may be implicitly derived, and resources may be frequency division multiplexed if corresponding to PSSCHs in different subchannels and/or different slots. For groupcast feedback, code division multiplexing and FDM may be allowed between PSFCH resources used by different receive UEs for HARQ feedback of the same PSSCH transmission. Feedback may include only NACK, or ACK or NACK. Feedback may be limited to a threshold distance between UEs, and the threshold may be indicated in SCI.

In some aspects, HARQ feedback (ACK/NACK) for downlink Uu may be carried on an uplink channel, such as in a physical uplink control channel or piggybacked on a physical uplink shared channel. The HARQ feedback may acknowledge downlink data on a PDSCH or a downlink grant on PDSCH (SPS release). HARQ feedback may use a codebook that is semi-static (ACK/NACK bit sent if no grant is received) or dynamic (ACK/NACK bit sent if grant is received). A downlink assignment index (DAI) counter may help to track missing grants, which may cause a mismatch in a number of feedback bits between the BS 110 and UE 120. Code block group (CBG) ACK may also be supported for the downlink. As for the uplink, an ACK may be implicitly indicated via a new data indicator toggle in an uplink grant. Beam management may help to close a link overcoming high path loss, such as for mmWave beams. However, sidelink has some extra considerations for grants. For example, stages of multi-stage grants may be transmitted by different nodes (grant may be split between Uu downlink control information (DCI) and SCI). Also, a single UE may communicate with multiple UEs on multiple sidelinks (unicast or groupcast). UEs may relay grants from other UEs.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a wireless communication device 305 may operate using a transmission mode where resource selection and/or scheduling is performed by wireless communication device 305 (e.g., rather than a BS 110). In some aspects, wireless communication device 305 may perform resource selection and/or scheduling by sensing channel availability for transmissions. For example, wireless communication device 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and may select a channel for transmission of a sidelink communication based at least in part on the measurement(s).

Additionally, or alternatively, wireless communication device 305 may perform resource selection and/or scheduling using SCI 330 received in the PSCCH 315, which may indicate occupied resources and/or channel parameters.

Additionally, or alternatively, wireless communication device 305 may perform resource selection and/or scheduling by determining a channel busy rate (CBR) associated with various sidelink channels, which may be used for rate control (e.g., by indicating a maximum number of resource blocks that the wireless communication device 305 can use for a particular set of subframes).

In the transmission mode where resource selection and/or scheduling is performed by a wireless communication device 305, wireless communication device 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on PSSCH 320 (e.g., for TBs 335), one or more subframes to be used for the upcoming sidelink transmission, and/or an MCS to be used for the upcoming sidelink transmission. In some aspects, a wireless communication device 305 may generate a sidelink grant that indicates one or more parameters for semi-persistent scheduling (SPS), such as a periodicity of a sidelink transmission. Additionally, or alternatively, wireless communication device 305 may generate a sidelink grant for event-driven scheduling, such as for an on-demand sidelink message.

As indicated above, FIG. 3 is provided as an example. Other examples may differ from what is described with respect to FIG. 3.

Figure 4:
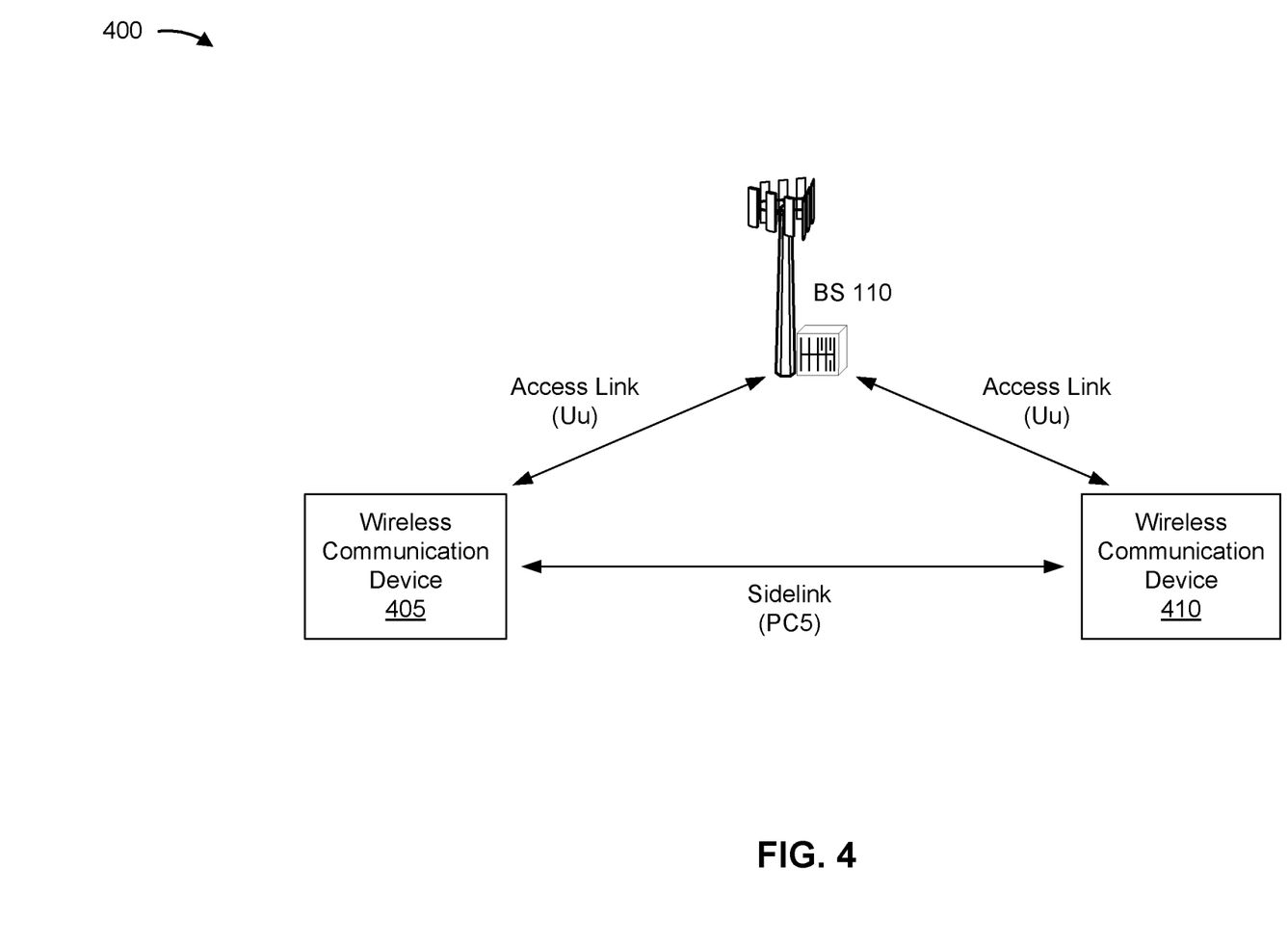
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, wireless communication device 405 and a wireless communication device 410 may communicate with one another via a sidelink, as described above in connection with FIG. 3. As further shown, in some sidelink modes, a BS 110 may communicate with wireless communication device 405 via a first access link. Additionally, or alternatively, in some sidelink modes, BS 110 may communicate with wireless communication device 410 via a second access link. Wireless communication device 405 and/or wireless communication device 410 may correspond to one or more UEs 120, BSs 110, and/or integrated access and backhaul (IAB) nodes. As an example, "sidelink" may refer to a direct link between UEs 120, and "access link" may refer to a direct link between a BS 110 and a UE 120. Sidelink communications may be transmitted on a PC5 interface via the sidelink, and access link communications may be transmitted via the access link. An access link communication may be either a downlink communication (from a BS 110 to a UE 120) or an uplink communication (from a UE 120 to a BS 110) on a Uu interface.

As indicated above, FIG. 4 is provided as an example. Other examples may differ from what is described with respect to FIG. 4.

As described above, a wireless communication device may communicate with a BS on a Uu interface associated with an access link. For example, a wireless communication device may transmit a PUCCH communication on an uplink to convey an acknowledgement message to acknowledge downlink data. Additionally, or alternatively, the wireless communication device may include an acknowledgment message with a PUSCH communication.

Similarly, a first wireless communication device may communicate with a second wireless communication device on a PC5 interface associated with a sidelink. In this case, the first wireless communication device may transmit a feedback message, such as an ACK message or a NACK message on PSFCH. In this case, the first wireless communication device may TDM a PSCCH, PSSCH, and a PSFCH for transmission, but may not FDM the aforementioned channels. A PSFCH for conveying feedback information may be used for single-stage grants, grants for a single sidelink, and/or other scenarios. However, other types of grants and links, such as multi-stage grants and multi-link connections may be used.

Some aspects described herein enable sidelink feedback messaging that is based at least in part on a particular timing. For example, when a wireless communication device receives information, such as a grant, data on a resource identified by a grant, a multi-stage grant, a multi-packet grant, a relaying communication, the wireless communication device may transmit one or more feedback messages to acknowledge the information. In this case, the wireless communication may transmit the one or more feedback messages after a time period since receiving the information. The wireless communication device may determine the time period based at least in part on one or more factors such as a type of sidelink communication, a type of feedback message, a quantity of stages for a multi-stage grant, and/or which channel is used for the feedback message. In some aspects, the wireless communication device may determine a minimum time period that is to occur before transmitting the feedback message. In this way, the wireless communication device enables relaying grant acknowledgements and/or multi-stage grant acknowledgements. As a result, the wireless communication device reduces latency and enables other devices to conserve processing resources and signaling resources with improved communication of grants.

In some aspects, the time period may include a time duration between when a sidelink communication is received and when a feedback message is transmitted. In some aspects, the time period may be based at least in part on one or more timestamps, and/or one or more processes. For example, a time period may be a result of a comparison of a first time stamp associated with the sidelink communication and a second timestamp associated with initiation of transmission of the feedback message or completion of the feedback message. In another example, the time period may be defined by the start or completion of one or more processes. In some aspects, the time period may account for other time durations or processes that may occur between receiving a sidelink communication and transmitting the feedback message. In some aspects, the time period may apply to one stage of a multi-stage grant or to all stages of the multi-stage grant.

Feedback may be provided for multi-stage grants. Each stage of a multi-stage grant with m stages may be polar-encoded or independently encoded. The number of packets at a stage may be fixed/configured or dynamically indicated in one or more previous stages. For example, a granted resource may carry data to a relay UE, which must then relayed by a separate unicast to m UEs, and each of the m packets may carry special instructions (e.g., part of sidelink grant) for the corresponding UE. The multiple stages may be received from multiple sources. For example, a sidelink Mode 1 receive grant may be sent by a base station on a Uu to a UE, asking the UE to receive on a specific sidelink resource. That resource may still carry SCI (on the PSCCH) that now acts as the second stage of the grant (e.g., $1^{st}$ stage from Uu, $2^{nd}$ stage from sidelink). ACKs for the stages may also be transmitted to one or more nodes, such as to the base station, to the sidelink UE on a PSFCH, or to both.

Figure 5:
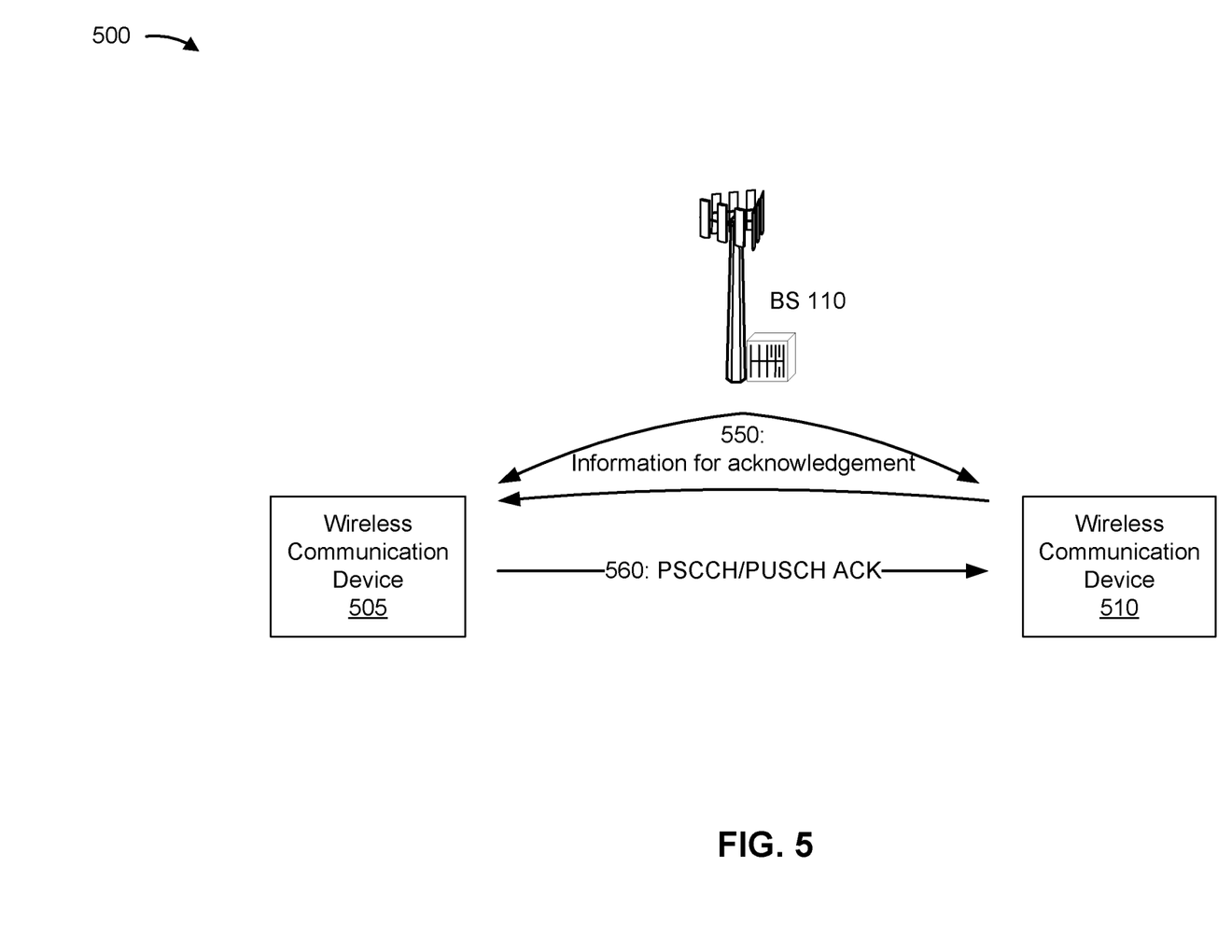
FIG. 5 is a diagram illustrating an example of sidelink feedback timing, in accordance with the present disclosure.

FIG. 5 is a diagram illustrating an example 500 of sidelink feedback messaging, in accordance with the present disclosure. As shown in FIG. 5, example 500 includes a first wireless communication device 505, a second wireless communication device 510, and a BS 110.

As further shown in FIG. 5, and by reference number 550, wireless communication device 505 may receive information for acknowledgement. For example, wireless communication device 505 may receive information for acknowledgement from wireless communication device 510, from BS 110, and/or from BS 110 via wireless communication device 510. In some aspects, wireless communication device 505 may receive a grant that wireless communication device 505 is to acknowledge. For example, wireless communication device 505 may receive the grant from BS 110 (e.g., via wireless communication device 510, in some aspects). Additionally, or alternatively, wireless communication device 505 may receive data on a resource granted by a grant and may be triggered to acknowledge the received data (or to negatively acknowledge a failure to receive data on the resource granted by the grant).

As further shown in FIG. 5, and by reference number 560, wireless communication device 505 may transmit a feedback message, such as an ACK on a PSCCH or a PUSCH. For example, wireless communication device 505 may transmit the feedback message to wireless communication device 510. Additionally, or alternatively, wireless communication device 505 may transmit a feedback message to a plurality of wireless communication devices 510 and/or to BS 110.

In some aspects, wireless communication device 505 may transmit the feedback message after a time period since receiving the information for acknowledgment. The information for acknowledgement may be referred to as a sidelink communication, and may involve a dynamic or configured grant. The time period may be a minimum time period or may extend an existing time gap between a sidelink communication and the feedback message. The time period may be based at least in part on one or more factors that are described below.

In some aspects, wireless communication device 505 may determine a time period based at least in part on a type of feedback message. For example, the feedback message may be an acknowledgment on a PSFCH or PSCCH. The feedback message may be a MAC-CE on a PSSCH or a PUCCH. Some types of feedback may involve a longer time period than other types.

In some aspects, wireless communication device 505 may determine the time period based at least in part on a type of the sidelink communication. For example, the sidelink communication may be a packet or a multi-stage packet. The sidelink communication may be a grant or a multi-stage grant. The time period may be based at least in part on how many packets are in a multi-stage packet or how many packets are in a multi-stage grant. In some aspects, wireless communication device 505 may receive a two-stage grant or a higher-stage (e.g., n stage) grant. In the case of a two-stage grant, wireless communication device 505 may receive a stage-1 grant in an SCI of a PSCCH, and the SCI may direct wireless communication device 505 to receive a stage-2 grant in an SCI mapped to a set of contiguous resource blocks in a PSSCH. Additionally, or alternatively, for an n-stage grant, wireless communication device 505 may receive an n−2-stage grant that includes information for decoding an n−1-stage grant (e.g., frequency or time resource information for the n−1-stage grant), which may include information for decoding an n-stage grant (e.g., frequency or time resource information for the n-stage grant). In some aspects, the sidelink communication may be one stage of a multi-stage grant, and wireless communication device 505 may determine the time period based at least in part on a timing of another stage of the multi-stage grant.

Similarly, for a multi-packet grant, wireless communication device 505 may receive a plurality of independently encoded packets conveying a grant (e.g., or a stage of a multi-stage grant). For example, for a multi-stage, multi-packet grant, a first stage grant may include information identifying a quantity of packets for a second stage grant. Additionally, or alternatively, the quantity of packets may be fixed in a standard. In some aspects, wireless communication device 505 may receive a multi-packet grant for relaying to a plurality of wireless communication devices 510. For example, each packet, of the multi-packet grant, may identify a different wireless communication device 510 to which wireless communication device 505 is to relay the packet. In some aspects, the sidelink communication is one packet of a multi-packet sidelink transmission, and wireless communication device 505 may determine the time period based at least in part on a timing of another packet of the multi-packet sidelink transmission.

In some aspects, wireless communication device 505 may receive a multi-packet grant or a multi-stage grant from a plurality of granting sources. For example, wireless communication device 505 may receive a first stage of a grant from BS 110, which may cause wireless communication device 505 to receive a second stage of the grant from wireless communication device 510. In this case, wireless communication device 505 may be triggered to transmit acknowledgement messages to a plurality of different devices (e.g., the plurality of granting sources).

In some aspects, wireless communication device 505 may determine the time period based at least in part on a time or frequency resource allocation of one or more stages or packets. For example, wireless communication device 505 may determine a timing for a first stage and/or packet based at least in part on a timing of second stage and/or packet. One of these stages may be a last stage that has to be decoded for identifying the time or frequency resource allocation of another stage.

In some aspects, the sidelink communication may correspond to the multi-stage grant, and wireless communication device 505 may determine the time period based at least in part on a quantity of stages in the multi-stage grant.

In some aspects, wireless communication device 505 may determine a minimum value for the time period that may be necessary. The minimum value may be due to a capability of the wireless communication device 505 or another wireless communication device (e.g., wireless communication device 510). Wireless communication device 505 may determine that a time period, as described for various aspects herein, may be a minimum time period. A minimum time period may be a smallest time duration for wireless communication device 505 to wait until transmitting the feedback message.

Wireless communication device 505 may transmit a feedback message (ACK) separately or bundled with other ACKs (e.g., subsets of ACKs). An ACK may be transmitted if all elements of a bundle are decoded, and a NACK may be transmitted otherwise. All packets of a stage may be bundled, or a packet may be bundled with all or a subset of previous packets that may be needed for decoding in order to determine the resource for the packet. ACKs for bundles of control packets may similar to CBG-based feedback, but applied to control messages instead of data messages. An ACK codebook may be semi-static, with a fixed number of bits regardless of a number of bundles to transmit. An ACK codebook may be more dynamic, and ACKs may be sent only for packets known to be present. A packet may be known to be present based at least in part on indications from previous packets (if decoded). A DAI-like mechanism may help to avoid mismatches between a transmitter and a receiver as to how many ACKs to expect. For example, ACKs may be indicated in the first stage and/or ordered based on the stage or a packet within the stage. ACK bits may be jointly encoded/transmitted (like Uu HARQ codebook) or separately encoded/transmitted (e.g., each ACK has its own PSFCH resource).

In some aspects, wireless communication device 505 may determine a time period based at least in part on a type of sidelink communication, where the sidelink communication is a particular feedback message payload or a bundling configuration. In some aspects, wireless communication device 505 may bundle a plurality of acknowledgement feedback messages for transmission. For example, with regard to a multi-stage grant or multi-packet grant, rather than transmitting a separate feedback message for each received packet, wireless communication device 505 may bundle two or more received packets into a single feedback message. In this case, based at least in part on successfully decoding each received packet of a group of received packets, wireless communication device 505 may transmit a single acknowledgement message for the group of received packets. Alternatively, based at least in part on a failure to successfully decode one or more of the group of received packets, wireless communication device 505 may transmit a negative acknowledgement message. In some aspects, wireless communication device 505 may bundle feedback messages related to a common stage. Additionally, or alternatively, wireless communication device 505 may bundle feedback messages related to linked stages. For example, when a first stage of a grant includes information for decoding a second stage of the grant, wireless communication device 505 may bundle feedback messages for the first stage of the grant and the second stage of the grant.

In some aspects, wireless communication device 505 may order acknowledgement messages in a bundled feedback message based at least in part on a stage and/or a packet order within a stage. In some aspects, wireless communication device 505 may jointly encode or separately encode acknowledgement bits in a bundled feedback message. In some aspects, wireless communication device 505 may configure bundling based at least in part on a characteristic of a network. For example, for relaying information, wireless communication device 505 may configure which feedback messages to bundle based at least in part on a quantity of hops and/or a quantity of alternative routes available. In some aspects, wireless communication device 505 may determine the time period based at least in part on which feedback messages to bundle based at least in part on a quantity of hops and/or a quantity of alternative routes available.

As mentioned above, feedback messages, such as grant ACKs, may be relayed. For example, UE 1 may sent a packet to UE 2, with instructions to transmit the packet to UE 3 and UE 4. UE 2 may transmit an ACK/NACK for the packet back to UE 1. UE 2 may also transmit an ACK/NACK indicating a successful delivery of the packet to UE 3, UE 4, or both. Alternatively, UE 2 may not need to transmit an ACK/NACK for successful delivery to UE 3, because eventually a higher layer ACK/NACK (e.g., radio link control (RLC) ACK) may be transmitted back from UE 3. However, a specific higher layer ACK/NACK may be absent (RLC unacknowledged mode), or may incur higher latency or network overhead. For example, an RLC NACK may be relayed back from UE 3 to UE 2 to UE 1. Then, UE 1 may re-transmit the whole upper-layer packet. Whereas if UE 1 immediately determines that the specific packet had a HARQ NACK from UE 2 to UE 3, UE 1 may indicate specific resources for UE 2 on which UE 2 may re-send the next HARQ attempt. In another example, if the packet was sent with CBG-based ACK/NACK, UE 1 may reduce the resource grant to match the number of CBGs to be retransmitted. Even if there is a HARQ failure (e.g., NACK until max attempts reached), UE 1 may instruct UE 2 to retransmit the packet as a new packet. Various combinations of relaying grants, multi-stage grants, and ACK bundling may be used.

In some aspects, wireless communication device 505 may determine the time period based at least in part on a timing of a feedback message relayed from another wireless communication device. Wireless communication device 505 may receive, from wireless communication device 510, a packet for relaying to BS 110 and may acknowledge receipt of the packet for relaying. Additionally, or alternatively, based at least in part on relaying the packet, wireless communication device 505 may receive an acknowledgement of a success of relaying the packet and may relay the acknowledgement to wireless communication device 510, as described in more detail herein. In some aspects, wireless communication device 505 may transmit a feedback message based at least in part on relaying information. For example, wireless communication device 505 may bundle an acknowledgement of a received packet from wireless communication device 510 with an acknowledgement from BS 110 that wireless communication device 505 successfully relayed the received packet to BS 110.

In some aspects, distance-based NACK rules may be used for relaying. For example, for V2X, wireless communication device 505 may not transmit a feedback message if wireless communication device 510 is too far away. With relaying, if multiple routes to a final destination are present, and a source is always expected to be close to one of the routes, wireless communication device 505 may determine the time period based at least in part on a location of the final destination and any hops in between. A threshold distance for the final destination or for a hop may be adjusted based at least in part on a function of a quantity of relay node locations, or a quantity of known relay node locations. In some aspects, wireless communication device 505 may determine the time period based at least in part on at least one of a quantity of hops in a multi-hop communication, a quantity of alternative routes for the multi-hop communication, a quantity of sources for a plurality of received packets, one or more locations of hops for the multi-hop communication, or some combination thereof.

In some aspects, wireless communication device 505 may determine the time period based at least in part on how sidelink resources are mapped to sidelink resource blocks. Sidelink resources may be divided into blocks, and a last few resources within each block may carry feedback channels to all sidelink resources in the block. A mapping of sidelink resources to the blocks may be pre-defined. Mapping may be based at least in part on sidelink resource locations, a link identifier, or an identifier for wireless communication device 505. Mapping may be used for both time and frequency allocation of feedback resources. In some aspects, wireless communication device 505 may determine the time period to be based at least in part on an end of a sidelink resource block mapped for feedback messages. This may be needed to meet minimum processing delay requirements.

In some aspects, wireless communication device 505 may transmit feedback messages considered unsuitable for sidelink (e.g., sidelink channel quality indicator). Such feedback messages may be transmitted via a medium access control control element (MAC CE) instead of on a PUCCH, and some feedback messages may be relayed over Uu. Wireless communication device 505 may determine the time period based at least in part on whether a feedback message is considered unsuitable.

Wireless communication devices benefit from more reliable feedback messages. If a feedback message is transmitted too soon, the feedback message may not be processed efficiently. If a wireless communication device is able to account for various factors, and even determine a minimum time period, as described herein, feedback messages may be received more successfully and sidelink communications will improve. Improved sidelink communications may cause the wireless communication device to conserve processing resources and signaling resources.

As indicated above, FIG. 5 is provided as an example. Other examples may differ from what is described with respect to FIG. 5.

Figure 6:
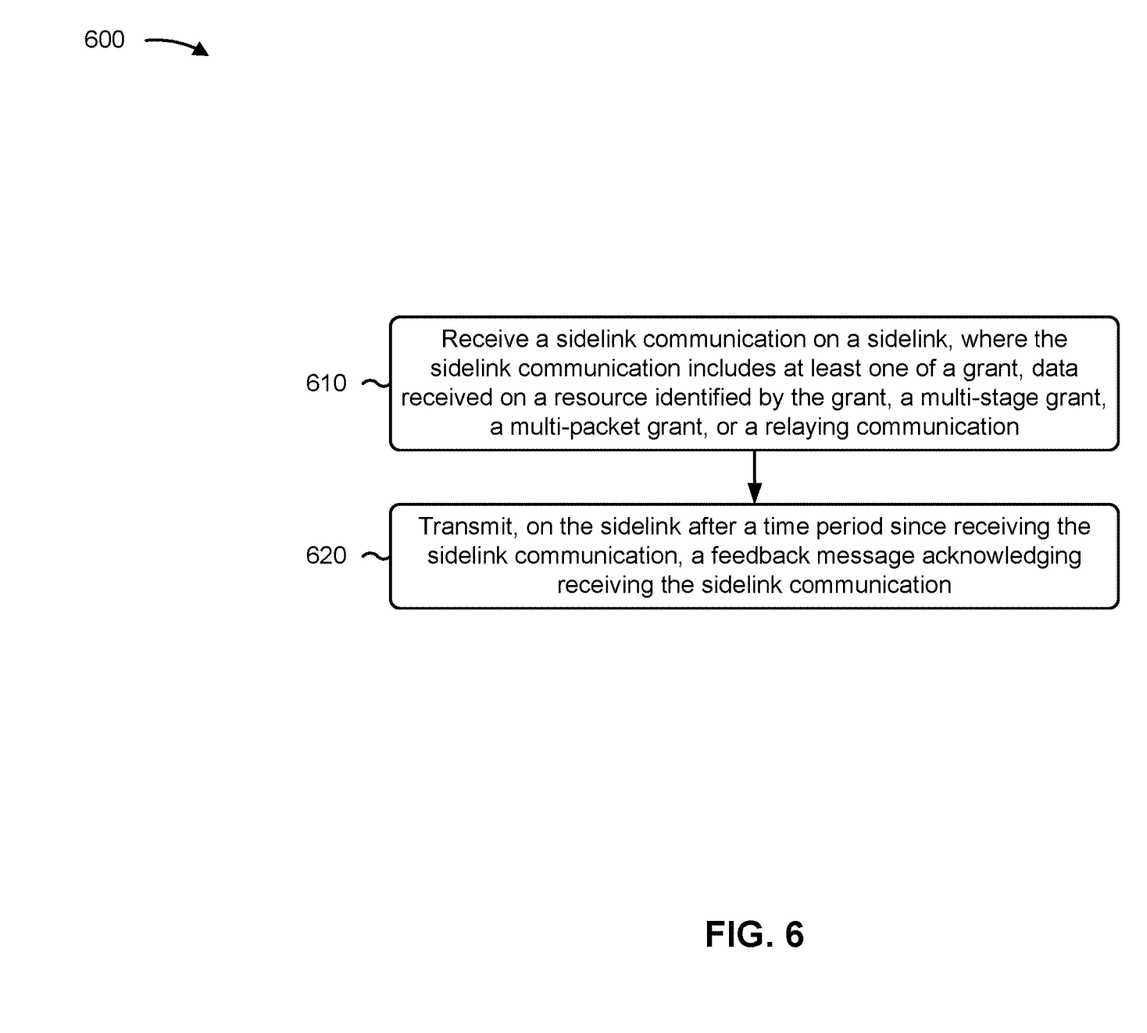
FIG. 6 is a diagram illustrating an example process performed, for example, by a wireless communication device, in accordance with the present disclosure.

FIG. 6 is a diagram illustrating an example process 600 performed, for example, by a wireless communication device, in accordance with the present disclosure. Example process 600 is an example where the wireless communication device (e.g., BS 110, UE 120, wireless communication devices 305, 405, 410, 505, and/or 510) performs operations associated with sidelink feedback timing.

As shown in FIG. 6, in some aspects, process 600 may include receiving a sidelink communication on a sidelink (block 610). For example, the wireless communication device (e.g., using antenna 234, DEMOD 232, MIMO detector 236, receive processor 238, controller/processor 240, antenna 252, DEMOD 254, MIMO detector 256, receive processor 258, controller/processor 280) may receive a sidelink communication on a sidelink, as described above. In some aspects, the sidelink communication includes at least one of a grant, data received on a resource identified by the grant, a multi-stage grant, a multi-packet grant, or a relaying communication.

As further shown in FIG. 6, in some aspects, process 600 may include transmitting, on the sidelink after a time period since receiving the sidelink communication, a feedback message acknowledging receiving the sidelink communication (block 620). For example, the wireless communication device (e.g., using antenna 234, DEMOD 232, MIMO detector 236, receive processor 238, controller/processor 240, antenna 252, DEMOD 254, MIMO detector 256, receive processor 258, controller/processor 280) may transmit, on the sidelink after a time period since receiving the sidelink communication, a feedback message acknowledging receiving the sidelink communication, as described above.

Process 600 may include additional aspects, such as any single aspect or any combination of aspects described below and/or in connection with one or more other processes described elsewhere herein.

In a first aspect, process 600 includes determining the time period based at least in part on one or more of a type of the sidelink communication or a type of the feedback message.

In a second aspect, alone or in combination with the first aspect, the sidelink communication corresponds to the multi-stage grant, and process 600 further includes determining the time period based at least in part on a quantity of stages in the multi-stage grant.

In a third aspect, alone or in combination with one or more of the first and second aspects, process 600 includes determining the time period based at least in part on whether the feedback message is carried on one of a physical sidelink feedback channel, a physical sidelink control channel, a physical sidelink shared channel, or a physical uplink control channel.

In a fourth aspect, alone or in combination with one or more of the first through third aspects, process 600 includes determining the time period based at least in part on one or more of a payload or bundling configuration of the feedback message.

In a fifth aspect, alone or in combination with one or more of the first through fourth aspects, process 600 includes determining the time period based at least in part on an end of a sidelink resource block mapped for feedback messages.

In a sixth aspect, alone or in combination with one or more of the first through fifth aspects, process 600 includes determining the time period based at least in part on a time or frequency resource allocation of one or more stages or packets.

In a seventh aspect, alone or in combination with one or more of the first through sixth aspects, the sidelink communication is one stage of a multi-stage grant, and process 600 includes determining the time period based at least in part on a timing of another stage of the multi-stage grant.

In an eighth aspect, alone or in combination with one or more of the first through seventh aspects, the sidelink communication is one packet of a multi-packet sidelink transmission, and process 600 includes determining the time period based at least in part on a timing of another packet of the multi-packet sidelink transmission.

In a ninth aspect, alone or in combination with one or more of the first through eighth aspects, process 600 includes determining the time period based at least in part on a timing of a feedback message relayed from another wireless communication device.

In a tenth aspect, alone or in combination with one or more of the first through ninth aspects, process 600 includes determining the time period based at least in part on at least one of a quantity of hops in a multi-hop communication, a quantity of alternative routes for the multi-hop communication, a quantity of sources for a plurality of received packets, one or more locations of hops for the multi-hop communication, or some combination thereof.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

The following provides an overview of some Aspects of the present disclosure:

Aspect 1: A method of wireless communication performed by a wireless communication device, comprising: receiving a sidelink communication on a sidelink, wherein the sidelink communication includes at least one of a grant, data received on a resource identified by the grant, a multi-stage grant, a multi-packet grant, or a relaying communication; and transmitting, on the sidelink after a time period since receiving the sidelink communication, a feedback message acknowledging receiving the sidelink communication.

Aspect 2: The method of Aspect 1, further comprising determining the time period based at least in part on one or more of a type of the sidelink communication or a type of the feedback message.

Aspect 3: The method of Aspect 1 or 2, wherein the sidelink communication corresponds to the multi-stage grant, and wherein for the method further comprises determining the time period based at least in part on a quantity of stages in the multi-stage grant.

Aspect 4: The method of any of Aspects 1-3, further comprising determining the time period based at least in part on whether the feedback message is carried on one of a physical sidelink feedback channel, a physical sidelink control channel, a physical sidelink shared channel, or a physical uplink control channel.

Aspect 5: The method of any of Aspects 1-4, further comprising determining the time period based at least in part on one or more of a payload or bundling configuration of the feedback message.

Aspect 6: The method of any of Aspects 1-5, further comprising determining the time period based at least in part on an end of a sidelink resource block mapped for feedback messages.

Aspect 7: The method of any of Aspects 1-6, further comprising determining the time period based at least in part on a time or frequency resource allocation of one or more stages or packets.

Aspect 8: The method of any of Aspects 1-7, wherein the sidelink communication is one stage of a multi-stage grant, and wherein the method further comprises determining the time period based at least in part on a timing of another stage of the multi-stage grant.

Aspect 9: The method of any of Aspects 1-7, wherein the sidelink communication is one packet of a multi-packet sidelink transmission, and wherein the method further comprises determining the time period based at least in part on a timing of another packet of the multi-packet sidelink transmission.

Aspect 10: The method of any of Aspects 1-9, further comprising determining the time period based at least in part on a timing of a feedback message relayed from another wireless communication device.

Aspect 11: The method of any of Aspects 1-10, further comprising determining the time period based at least in part on at least one of: a quantity of hops in a multi-hop communication, a quantity of alternative routes for the multi-hop communication, a quantity of sources for a plurality of received packets, one or more locations of hops for the multi-hop communication, or some combination thereof.

Aspect 12: An apparatus for wireless communication at a device, comprising a processor; memory coupled with the processor; and instructions stored in the memory and executable by the processor to cause the apparatus to perform the method of one or more Aspects of Aspects 1-11.

Aspect 13: A device for wireless communication, comprising a memory and one or more processors coupled to the memory, the memory and the one or more processors configured to perform the method of one or more Aspects of Aspects 1-11.

Aspect 14: An apparatus for wireless communication, comprising at least one means for performing the method of one or more Aspects of Aspects 1-11.

Aspect 15: A non-transitory computer-readable medium storing code for wireless communication, the code comprising instructions executable by a processor to perform the method of one or more Aspects of Aspects 1-11.

Aspect 16: A non-transitory computer-readable medium storing a set of instructions for wireless communication, the set of instructions comprising one or more instructions that, when executed by one or more processors of a device, cause the device to perform the method of one or more Aspects of Aspects 1-11.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has,"

"have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device for wireless communication, comprising:
   a memory; and
   one or more processors, coupled to the memory, configured to:
      receive a sidelink communication on a sidelink, wherein the sidelink communication includes at least one of a grant, data received on a resource identified by the grant, a multi-stage grant, a multi-packet grant, or a relaying communication; and
      transmit, on the sidelink and after a time period since receiving the sidelink communication, a feedback message, wherein the feedback message acknowledges the receiving the sidelink communication, and wherein the time period is the time period for transmitting the feedback message and is based at least in part on one or more of a type of the sidelink communication or a type of the feedback message.

2. The wireless communication device of claim 1, wherein the sidelink communication corresponds to the multi-stage grant, and wherein the one or more processors are further configured to determine the time period based at least in part on a quantity of stages in the multi-stage grant.

3. The wireless communication device of claim 1, wherein the one or more processors are further configured to determine the time period based at least in part on whether the feedback message is carried on one of a physical sidelink feedback channel, a physical sidelink control channel, a physical sidelink shared channel, or a physical uplink control channel.

4. The wireless communication device of claim 1, wherein the one or more processors are further configured to determine the time period based at least in part on one or more of a payload or bundling configuration of the feedback message.

5. The wireless communication device of claim 1, wherein the one or more processors are further configured to determine the time period based at least in part on an end of a sidelink resource block mapped for feedback messages.

6. The wireless communication device of claim 1, wherein the one or more processors are further configured to determine the time period based at least in part on a time or frequency resource allocation of one or more stages or packets.

7. The wireless communication device of claim 1, wherein the sidelink communication is one stage of a multi-stage grant, and wherein the memory and the one or more processors are configured to determine the time period based at least in part on a timing of another stage of the multi-stage grant.

8. The wireless communication device of claim 1, wherein the sidelink communication is one packet of a multi-packet sidelink transmission, and wherein the memory and the one or more processors are configured to determine the time period based at least in part on a timing of another packet of the multi-packet sidelink transmission.

9. The wireless communication device of claim 1, wherein the one or more processors are further configured to determine the time period based at least in part on a timing of a feedback message relayed from another wireless communication device.

10. The wireless communication device of claim 1, wherein the one or more processors are further configured to determine the time period based at least in part on at least one of:
    a quantity of hops in a multi-hop communication,
    a quantity of alternative routes for the multi-hop communication,
    a quantity of sources for a plurality of received packets,
    one or more locations of hops for the multi-hop communication, or
    some combination thereof.

11. A method of wireless communication performed by a wireless communication device, comprising:
    receiving a sidelink communication on a sidelink, wherein the sidelink communication includes at least one of a grant, data received on a resource identified by the grant, a multi-stage grant, a multi-packet grant, or a relaying communication; and
    transmitting, on the sidelink and after a time period since receiving the sidelink communication, a feedback message, wherein the feedback message acknowledges the receiving the sidelink communication, and wherein the time period is the time period for transmitting the feedback message and is based at least in part on one or more of a type of the sidelink communication or a type of the feedback message.

12. The method of claim 11, wherein the sidelink communication corresponds to the multi-stage grant, and wherein for the method further comprises determining the time period based at least in part on a quantity of stages in the multi-stage grant.

13. The method of claim 11, further comprising determining the time period based at least in part on whether the feedback message is carried on one of a physical sidelink feedback channel, a physical sidelink control channel, a physical sidelink shared channel, or a physical uplink control channel.

14. The method of claim 11, further comprising determining the time period based at least in part on one or more of a payload or bundling configuration of the feedback message.

15. The method of claim 11, further comprising determining the time period based at least in part on an end of a sidelink resource block mapped for feedback messages.

16. The method of claim 11, further comprising determining the time period based at least in part on a time or frequency resource allocation of one or more stages or packets.

17. The method of claim 11, wherein the sidelink communication is one stage of a multi-stage grant, and wherein the method further comprises determining the time period based at least in part on a timing of another stage of the multi-stage grant.

18. The method of claim 11, wherein the sidelink communication is one packet of a multi-packet sidelink transmission, and wherein the method further comprises determining the time period based at least in part on a timing of another packet of the multi-packet sidelink transmission.

19. The method of claim 11, further comprising determining the time period based at least in part on a timing of a feedback message relayed from another wireless communication device.

20. The method of claim 11, further comprising determining the time period based at least in part on at least one of:
- a quantity of hops in a multi-hop communication,
- a quantity of alternative routes for the multi-hop communication,
- a quantity of sources for a plurality of received packets,
- one or more locations of hops for the multi-hop communication, or
- some combination thereof.

21. A non-transitory computer-readable medium storing one or more instructions for wireless communication, the one or more instructions comprising:
- one or more instructions that, when executed by one or more processors of a wireless communication device, cause the one or more processors to:
  - receive a sidelink communication on a sidelink, wherein the sidelink communication includes at least one of a grant, data received on a resource identified by the grant, a multi-stage grant, a multi-packet grant, or a relaying communication; and
  - transmit, on the sidelink and after a time period since receiving the sidelink communication, a feedback message, wherein the feedback messages acknowledges the receiving the sidelink communication, and wherein the time period is the time period for transmitting the feedback message and is based at least in part on one or more of a type of the sidelink communication or a type of the feedback message.

22. An apparatus for wireless communication, comprising:
- means for receiving a sidelink communication on a sidelink, wherein the sidelink communication includes at least one of a grant, data received on a resource identified by the grant, a multi-stage grant, a multi-packet grant, or a relaying communication; and
- means for transmitting, on the sidelink and after a time period since receiving the sidelink communication, a feedback message, wherein the feedback message acknowledges the receiving the sidelink communication, and wherein the time period is the time period for transmitting the feedback message and is based at least in part on one or more of a type of the sidelink communication or a type of the feedback message.

\* \* \* \* \*